March 9, 1937.  A. G. BUTLER ET AL  2,073,362
RETRACTABLE LANDING GEAR
Filed June 8, 1933   4 Sheets-Sheet 1
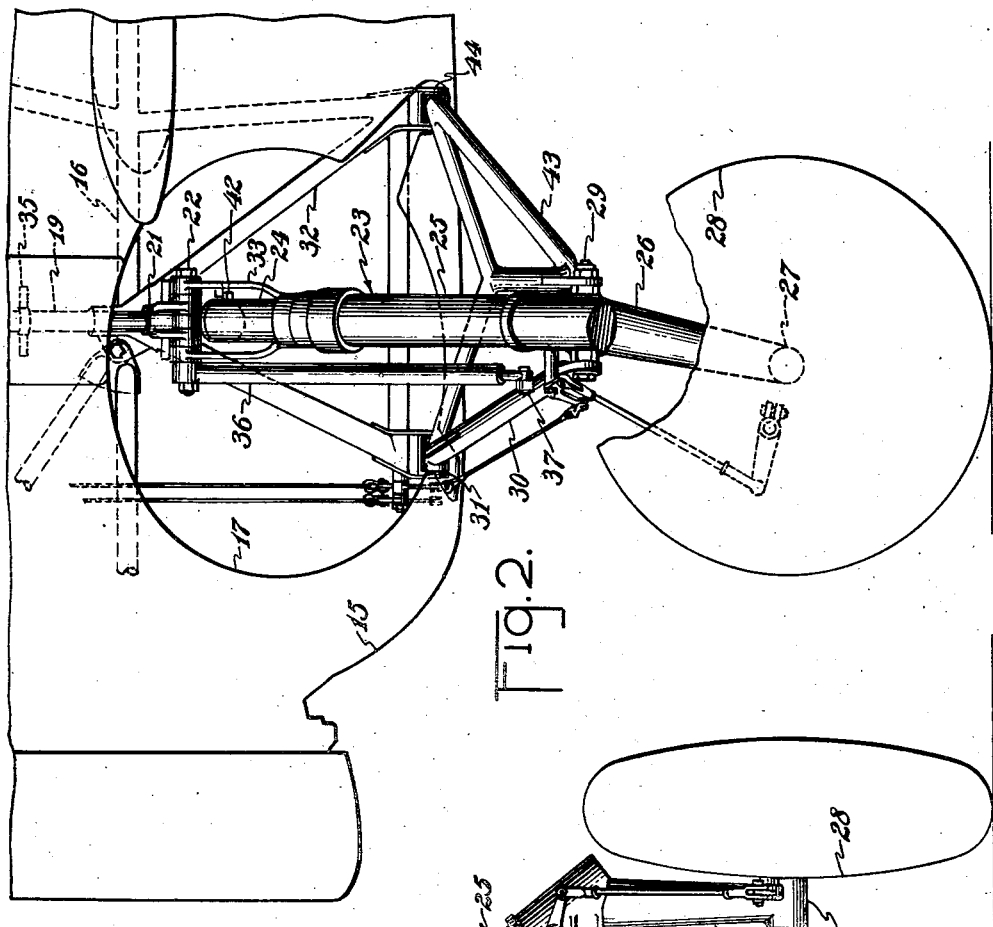
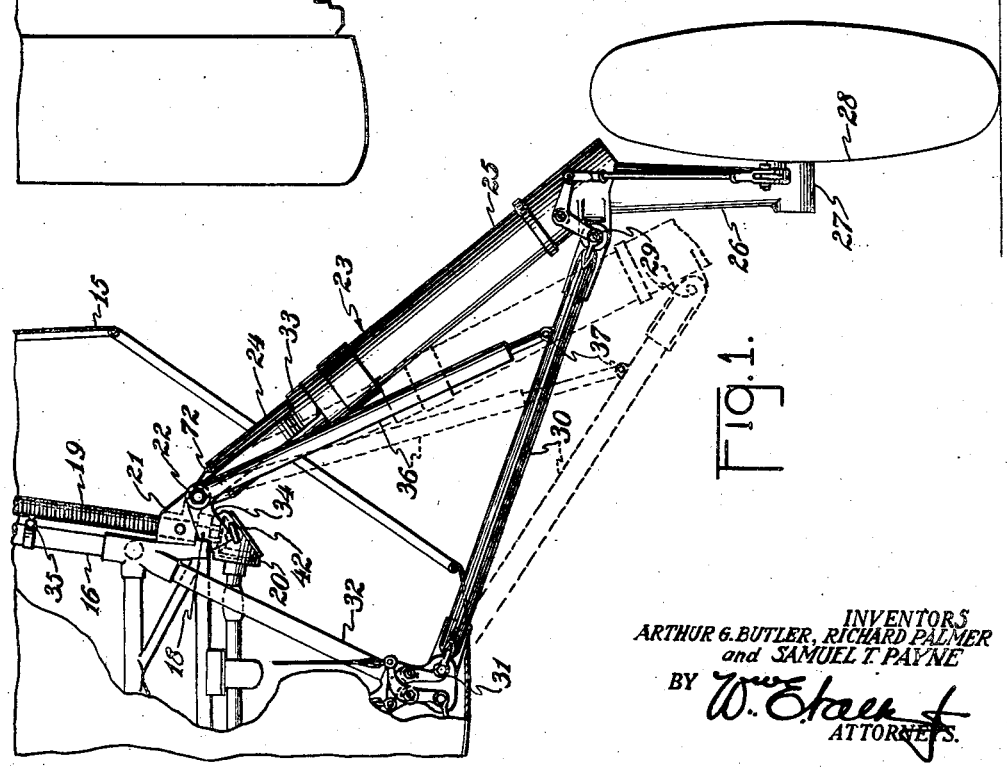
INVENTORS
ARTHUR G. BUTLER, RICHARD PALMER
and SAMUEL T. PAYNE
BY
ATTORNEYS.

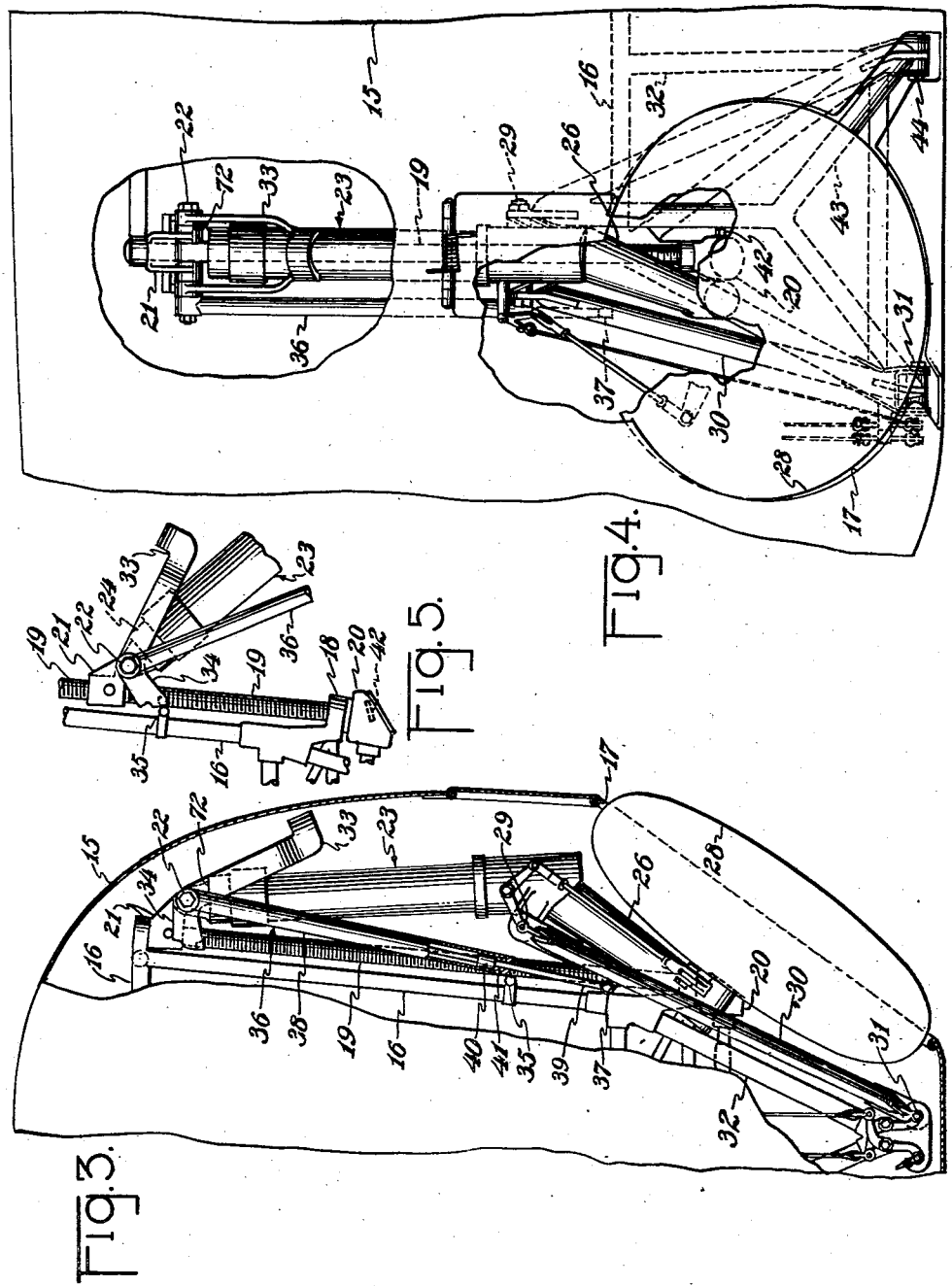

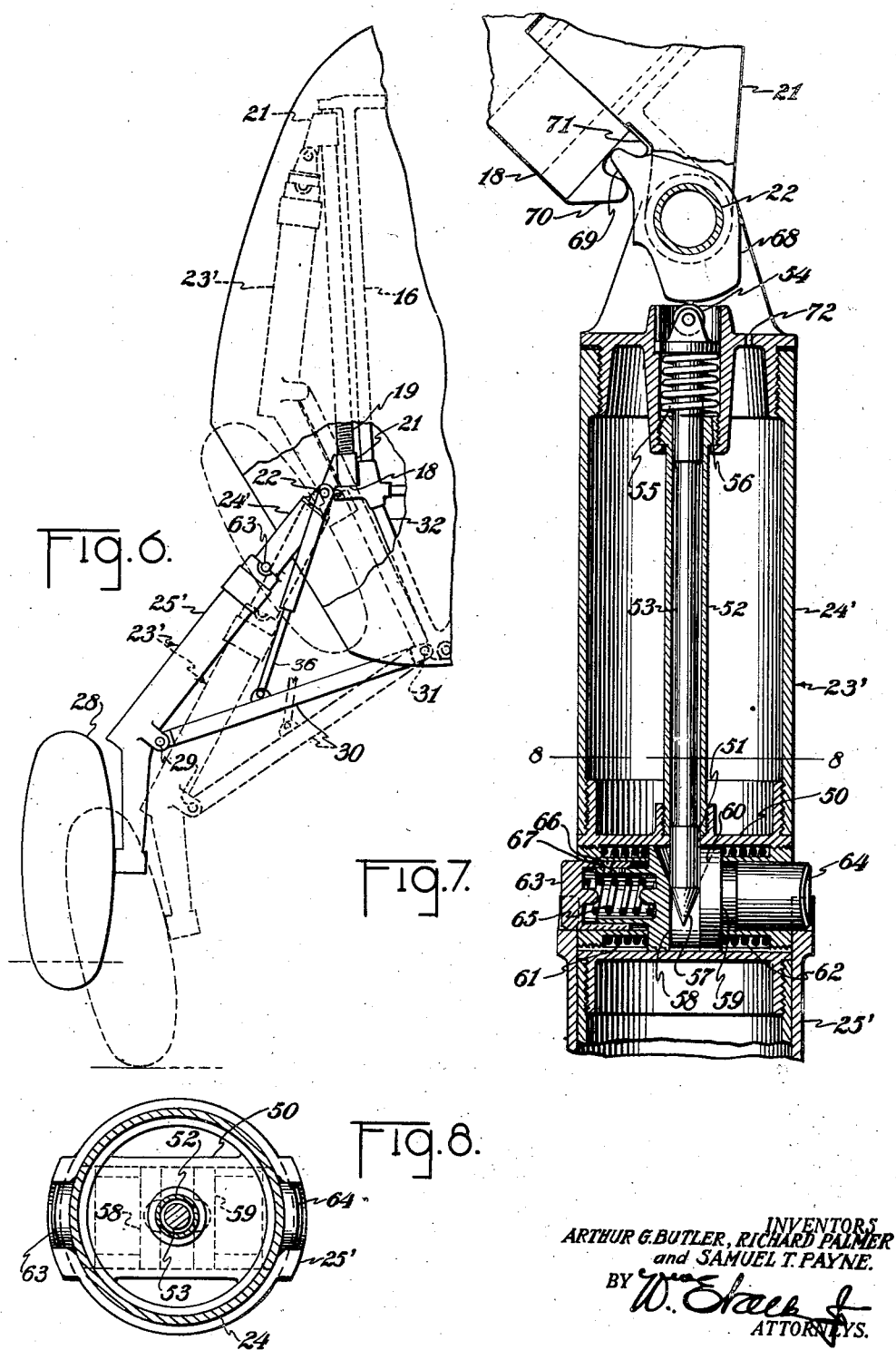

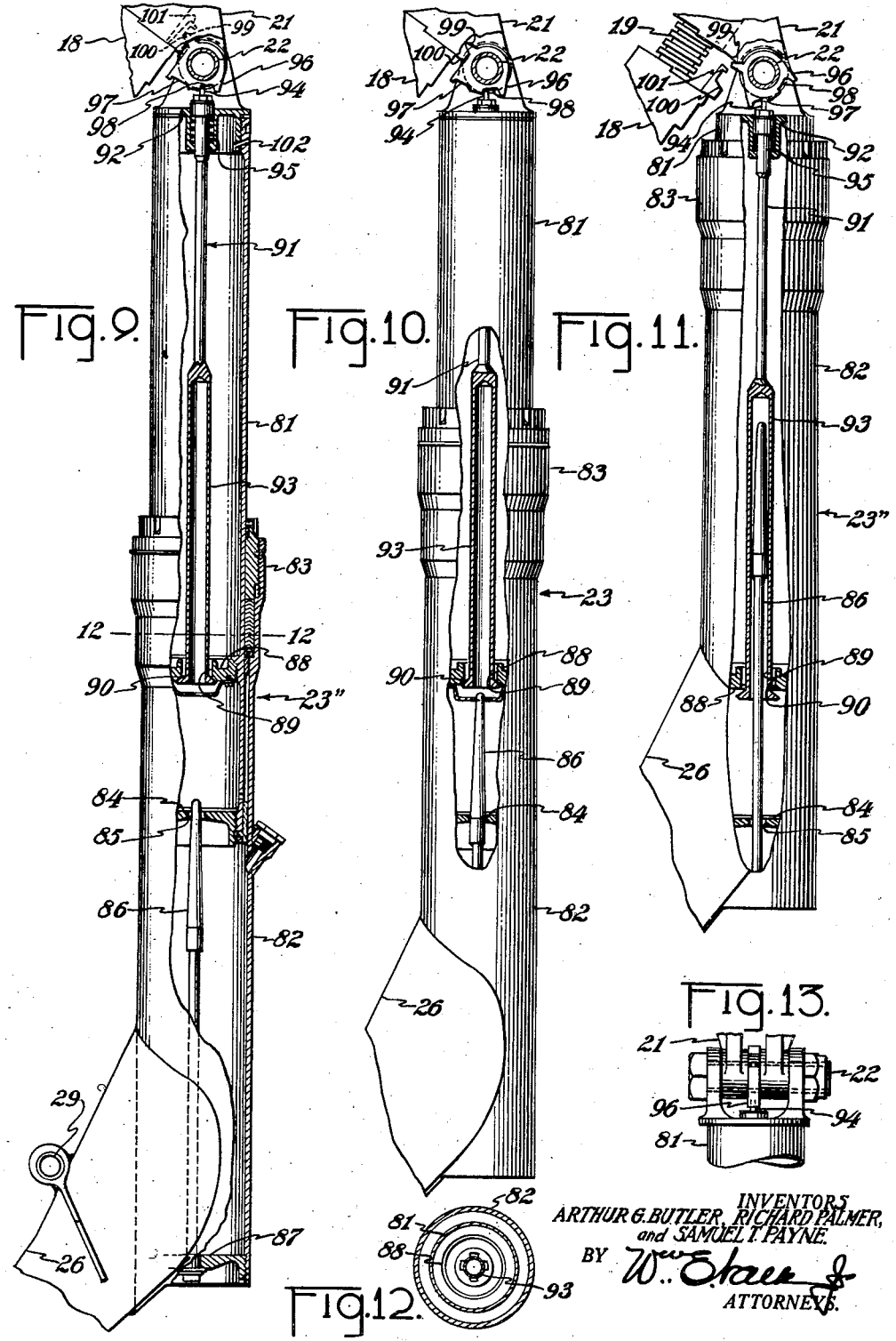

Patented Mar. 9, 1937

2,073,362

UNITED STATES PATENT OFFICE 2,073,362

RETRACTABLE LANDING GEAR

Arthur G. Butler, Eggertsville, and Richard E. Palmer and Samuel T. Payne, Kenmore, N. Y., assignors, by mesne assignments, to Curtiss-Wright Corporation, a corporation of New York Application June 8, 1933, Serial No. 674,812

17 Claims. (Cl. 244—102)

This invention relates to aircraft, and more particularly to retractable landing gears therefor.

An object of the invention is to provide a retractable landing gear adapted to be used in conjunction with the fuselage of an airplane, which gear, by its construction, is adapted to occupy a relatively small space within the aircraft fuselage when retracted, but which, when extended, is adapted to extend outward a substantial distance from the plane of symmetry of the aircraft in order to make available a wide tread between the ground contact elements.

A further object is to provide mechanism for extending and retracting the landing gear.

A further object is to provide means automatically operable upon extension or retraction of the landing gear to cause certain elements thereof to occupy less space when retracted within the aircraft, than when extended therefrom.

A further object is to provide novel forms of shock absorbing struts, adapted to be used with this type of landing gear, which are extendible in length when the landing gear is extended, and which may be collapsed into small compass when the landing gear is retracted within the fuselage.

Still another object is to provide alternative forms of shock absorbing struts of the above nature, all of which are adapted to use hydraulic shock absorption means, and certain of which are adapted to use in conjunction with the hydraulic shock absorption means, a pneumatic resilient mechanism for supporting the aircraft when resting upon, or rolling along the ground.

Additional objects will be apparent from a reading of the specification and claims and from a consideration of the drawings, in which:

Fig. 1 is a front elevation, partly broken away, of an airplane fuselage with the landing gear in its extended position;

Fig. 2 is a side elevation, partly broken away, of an airplane fuselage with the landing gear in its extended position;

Fig. 3 is a front elevation, partly broken away, of the airplane fuselage, showing the landing gear in its retracted position;

Fig. 4 is a side elevation, partly broken away, of the airplane fuselage showing the landing gear in its retracted position;

Fig. 5 is a side elevation of a portion of the landing gear retracting mechanism, shown in a different position of adjustment from that shown in Figs. 1 and 3;

Fig. 6 is a front elevation, partly broken away, of an airplane fuselage including an alternative embodiment of the landing gear in its extended position;

Fig. 7 is a longitudinal section of a portion of a landing gear as shown in Fig. 6;

Fig. 8 is a section on the line 8—8 of Fig. 7;

Figs. 9, 10 and 11 are front elevations, partly in section, of an alternative embodiment of the shock absorbing strut used in the landing gear in different positions of adjustment;

Fig. 12 is a section on the line 12—12 of Fig. 9; and

Fig. 13 is a side elevation of the upper portions of Figs. 9 and 10.

The landing gear comprises generally a pair of substantially vertical lead screws spaced on opposite sides of the fuselage plane of symmetry. These lead screws are adapted to be turned by suitable mechanism and each has a nut adapted to be traversed therealong. To each nut is pivoted a collapsible strut which serves the purpose of a shock absorbing strut, extending, when the landing gear is extended, downward and outwardly from the fuselage. The lower end of the strut is provided with a wheel axle and wheel. To the lower end of the strut is hinged a brace strut, pivoted at its opposite end to a suitable bracket carried at the lower part of the fuselage. An opening is provided in the fuselage through which the struts extend, and within which the landing gear and wheel may be retracted by turning the lead screw and traversing the nut therealong. The shock absorbing strut is arranged to telescope as the landing gear is retracted, so that it is of substantially shorter length when retracted than when extended. A connecting link, extending from the nut to a point intermediate the lower brace strut, serves to collapse the shock absorbing strut when the landing gear is retracted, and to extend the shock absorbing strut when the landing gear is extended. Such a link or its equivalent forms a definite feature of the invention and is intended to be used in connection with landing gears utilizing any one of the shock absorber struts and locking means shown and hereinafter described in detail.

Mechanism is provided to lock the shock absorbing strut in an extended position when the landing gear is extended, so that, when landing shocks are imposed upon the landing gear, the shock absorbing strut may deflect to a limited degree, but not in sufficient degree to collapse to its full extent. The fully collapsed position of the shock absorbing strut is only allowed when the landing gear is fully retracted. Alternative forms of locking mechanism are provided in the invention, and an alternative form of hydropneumatic shock absorbing strut, fulfilling broadly the above outlined functions, is also made a part of this invention.

For a more detailed description, reference may be made to the drawings. Figs. 1, 2, 3, 4 and 5 show the specific arrangement of one embodiment of the shock absorbing strut and indicate also the general arrangement of the landing gear in which subsequent embodiments of the shock absorbing strut, as shown in Figs. 6 to 13, inclusive, may be used. The figures show only one side of the landing gear. The opposite side of the landing gear is identical in every respect, the parts being in opposite phase, so that a description of one side will suffice for the whole. An airplane fuselage 15, having a skeleton framework 16, is provided with an opening 17 of substantially circular shape in its lower side surface. To the framework 16, a bearing 18 is attached, and in this bearing a lead screw 19 is journaled. Suitable mechanism 20 comprising beveled gears and shafting, is provided at one end of the lead screw 19 for turning said screw under the control of the aircraft crew. A nut 21 encircles the lead screw 19, said nut being provided with a pivot 22, to which is pivoted at its upper end, a shock absorbing strut 23. Said strut comprises an upper plunger 24 and a lower cylinder 25, within which the plunger is adapted to slide. At the lower end of the cylinder 25, an arm 26 carrying an axle 27 is rigidly mounted, said axle having a wheel 28 mounted for ground contact. Toward the lower end of the strut 23, a pivot 29, axially parallel to the pivot 22, carries a brace strut 30, of fixed length, which is pivoted at its inner end as at 31 to an extension 32, depending from the fuselage framework 16. The mechanism described thus far is not particularly dissimilar to some previous types of landing gears. It is apparent that upon turning of the lead screw 19 in one direction, the nut 21 is drawn upwardly therealong, retracting the landing gear as a whole within the aircraft fuselage so that the wheel 28 lies substantially flush with the outer surface of said fuselage in a position such as that shown in Fig. 3. An important phase of our invention lies in the fact that the shock absorbing strut 23 has several attitudes of length which it may assume, according to the attitude of the aircraft, and according to the position in which the landing gear as a whole is placed. Fig. 1, in dotted lines, shows the position which the extended landing gear assumes when the aircraft is in flight. In such position, the cylinder 25 is extended fully from the plunger 24, and, by more or less conventional oleo shock absorbing means within the strut 23, said strut is subject to compression upon landing, whereupon it assumes a position such as that shown in solid lines in Figs. 1 and 2. In such position, the cylinder 25 is partly telescoped upon the plunger 24. A locking member 33, engageable along the plunger 24, is provided to limit the distance which the cylinder 25 may telescope upon the plunger 24, so that, when the aircraft rests upon the ground, the wheels 28 will be in a substantially vertical position. In the embodiments of Figs. 1 to 8, inclusive, taxiing shocks imposed upon the landing gear are assumed by the tires on the wheels 28; under all conditions when the aircraft is resting upon the ground, the upper end of the cylinder 25 will abut the locking member 33.

When the aircraft is in flight, the landing gear extends by gravity to the positions shown in dotted lines in Fig. 1. Retraction of the gear within the fuselage may then be initiated by turning the lead screw 19, which traverses the nut 21 upwardly therealong. As such action takes place, a bracket 34 forming part of the locking member 33 which, in turn, is pivoted to the pivot 22, engages a dog 35 on the framework 16 which tips the locking member 33 upwardly and out of engagement with the plunger 24. Simultaneously with such upward movement of the nut 21, a connecting link 36 having a lost motion mechanism, more clearly shown in Fig. 3, draws the cylinder 25 upwardly to effect total telescoping of said cylinder upon the plunger 24. Said connecting link is hinged, at its upper end, to the pivot 22, and at its lower end to an intermediate pivot 37 on the brace strut 30. Said link 36 comprises an upper cylindrical member 38 hinged to the pivot 22, and a lower rod 39 hinged to the pivot 37. Said rod is provided with a collar 40 which engages an internal shoulder 41 at the lower end of the member 38, when the link 36 is tensioned. The link 36 thus provides means for limiting the extent of the downward motion of the landing gear when said landing gear is extended, and, by its connection with the brace strut 30, causes the shock absorbing strut 23 to fully collapse when the landing gear is retracted.

In extending the landing gear from its fully retracted position, the lead screw 19 may be turned in the opposite direction, whereupon the struts 23 and 30, and the wheel 28 are extended from the aircraft. By the action of gravity, the shock absorbing strut 23 extends as fast as the link 36 will permit it, until, when fully extended, the landing gear assumes the position shown in dotted lines in Fig. 1. As the landing gear approaches its fully extended position, the bracket 34 carried by the locking member 33, engages a dog 42 carried by the framework 16, thereby forcing the locking member 33 into engagement with the plunger 24 of the shock absorbing strut. This places the landing gear in a position ready for landing. Upon landing, as heretofore described, the cylinder 25 of the shock absorbing strut partly collapses upon the plunger 24 until the upper end of said cylinder engages the locking member 33.

As shown in Fig. 2, the brace strut 30 and the pivot 31 may be supplemented by brace struts 43, pivoted as at 44 in alignment with the pivot 31, so that longitudinal thrust loads on the landing gear may be properly assumed.

Referring to Figs. 6 to 8, inclusive, an alternative form of mechanism for locking the shock absorbing strut 23 from inadvertent complete collapsing when the aircraft is on the ground, is shown. In this arrangement, a shock absorbing strut 23' comprises a plunger 24' carried at its upper end by the pivot 22 and over which is adapted to telescope a cylinder 25' arranged at its lower end to carry the wheel 28. The plunger 24' is provided with a transverse cylinder 50 having an opening 51 coaxial with the plunger 24'. A sleeve 52 extends, coaxially, with the plunger 24', from the head of said plunger to abut the opening 51. In said sleeve, a rod 53 is arranged for a limited reciprocating movement, said rod being provided at its upper end with a contact element 54 and a spring 55 bearing, respectively, on the lower face of the contact element and on a suitable boss 56 formed on the sleeve 52. The rod 53 is pointed at its lower end, the point 57 being engageable with a pair of opposed plugs 58 and 59 slidable within the transverse cylinder 50. Said plugs are similar, and have beveled faces 60 which may more readily be engaged by the point 57. The plugs 58 and 59 are resiliently urged toward the plunger axis by means of springs 61 and 62. Thimbles 63 and 64 are slidable transversely of the plunger axis, over portions of the plugs 58 and 59, respectively, these thimbles being urged outwardly with respect to the plugs by springs 65. Movement of the thimbles with respect to the plugs is limited by a set screw 66 carried by the thimbles and engaging an elongated slot 67 formed in the plug. The thimbles 63 and 64 normally move with their respective plugs 58 and 59 between positions wherein their outer surfaces are flush with the outer surface of the plunger 24', and positions such as those shown in Fig. 7 where the outer ends of the thimbles extend slightly beyond the outer surface of the plunger 24'. In the latter attitude, the thimbles form a stop for the cylinder 25', whereby the cylinder, by the engagement of its upper end with the thimbles, is prevented from completely telescoping upon the plunger 24'. Such position is effected when the landing gear as a whole is in its extended position, the rod 53 being forced downwardly to separate the plugs 58 and 59 by virtue of a cam 68 carried by the pivot 22 and engageable with the contact element 54, as the landing gear is extended by virtue of turning the lead screw 19. The cam 68 is provided with a tooth 69 engageable with teeth 70 and 71 carried on the lead screw bearing 18, so that, when the nut 21 approaches its lowermost position, the tooth 69 engages the tooth 70, forcing the cam 68 to depress the contact element 54 and the rod 53.

Upon retraction of the landing gear, the tooth 71 causes the cam 68 to be turned away from the contact element 54, allowing the rod 53 to be pushed upwardly by the spring 55. Thereupon, the plugs 58 and 59 are forced inwardly, carrying with them the thimbles 63 and 64. Then, upon further retraction of the landing gear, as previously described in connection with Figs. 1 to 5, inclusive, the cylinder 25' may telescope completely over the plunger 24' under the influence of a link such as 36 in Fig. 1, so that the landing gear as a whole assumes the retracted position indicated in dotted lines in Fig. 6.

In the embodiments thus far described, an air vent 72 is provided in the upper wall of the plungers 24 and 24', so that, when the shock absorbing struts 23 or 23' are fully telescoped, air within the struts may escape, thus lessening the effort necessary to retract the landing gear.

Figs. 9 to 13, inclusive, illustrate an alternative embodiment of the shock absorbing strut, designated in its entirety as 23''. Said strut, as in the previous embodiments, is hinged at its upper end to the pivot 22, carries at its lower end the arm 26, and is provided with a pivot 29 adapted to engage with other members of the landing gear. The strut 23'' is broadly of the oleo pneumatic type, and comprises a plunger 81 pivoted at its upper end to the pivot 22 and adapted to telescope within a cylinder 82 which carries at its lower end the wheel supporting arm 26. The cylinder 82 is provided with a packing gland 83 of conventional design, which forms a tight seal around the plunger 81. Said plunger is provided with a lower partition 84 having a central orifice 85, within which a metering pin 86 may register, said metering pin being carried on the lower closure 87 of the cylinder 82. The plunger 81 is also provided with an intermediate partition 88, having formed therein a central opening 89 having a valve seat 90. Coaxially with the plunger 81, a valve 91 extends from the valve seat 90 upwardly through the upper closure 92 of the plunger. Said valve includes a hollow portion 93, closed at its upper end and open at its lower end, the lower end being formed externally to engage the valve seat 90. This hollow portion 93 is arranged to receive the metering pin 86 when the shock absorbing strut is fully compressed, as shown in Fig. 11. The upper end of the valve stem 91 is provided with a contact element 94 protruding through the closure 92, said closure having a recess within which a spring 95 is arranged to constantly urge the valve stem toward a seated position with the valve seat 90. A cam 96 is arranged to rotate on the pivot 22 and carries two cam faces 97 and 98. When the cam 96 is turned so that the cam face 97 engages the contact element 94, the valve stem 91 is pushed downwardly, providing an opening between said valve stem and the valve seat 90. When the cam 96 is turned so that the cam face 98 lies adjacent the contact element 94, said valve stem may rise under the action of the spring 95 to close the valve stem against the seat 90. Clearance is provided between the cam face 98 and the contact element 94 so that the valve stem may not ride open from the valve seat 90.

A tooth 99 carried by the cam 96 is adapted to engage with teeth 100 and 101 as the landing gear is extended or retracted. Upon extension of the landing gear, the tooth 99 engages the tooth 100, whereupon the cam 96 is turned to allow the valve stem 91 to close against the valve seat 90. In this position, the landing gear is ready for the action of landing shocks. Upon landing, the cylinder 82 is driven upwardly with respect to the plunger 81, and fluid within the lower portion of the cylinder 82 is forced through the orifice 85. The metering pin 86 retards rapid flow of the fluid through the orifice, thus providing controlled shock absorption according to well known principles. As fluid passes through the orifice 85, air is compressed between the partitions 84 and 88, and compressed air is likewise driven upwardly within the hollow of the valve stem portion 93. As the aircraft comes to rest upon the ground, the shock absorbing strut will assume a position such as that shown in Fig. 10, wherein the compressed air within the valve stem portion 93 and between the partitions 88 and 84, resiliently supports the weight of the aircraft. When the aircraft is in flight, the compressed air forces the shock absorbing strut to its extended position such as in Fig. 9. Thereupon, retraction of the landing gear may be effected by the aircraft crew. Upon initiation of such retraction, the lead screw 19 is turned, raising the nut 21 and causing the tooth 99 on the cam 96 to engage the stationary tooth 101, thus turning the cam 96 to the position shown in Fig. 11, wherein the cam face 97 depresses the valve stem, forming an opening between the valve stem and the valve seat 90. Upon further retraction of the landing gear and by the action of the connecting link 36, heretofore described, the cylinder 82 is telescoped upon the plunger 81. During such telescoping action, fluid from the lower portion of the cylinder is forced upwardly through the orifice 85 and continues upwardly through the opening in the partition 88, driving the air contained within the shock absorbing strut outwardly through a vent 102 formed in the upper portion of the plunger 81. Full telescoping of the shock absorbing strut may then be accomplished without exerting any compressive force upon the air contained therein. Upon extension of the landing gear from the fully retracted position, the cylinder 82 extends from the plunger 81 by gravity, and the fluid within the shock absorber passes downwardly, through the opening in the partition 88, and through the orifice 85. Concurrently, air is drawn into the strut through the vent 102. When the landing gear approaches its fully extended position, the cam tooth 99 engages the fixed tooth 100, closing the valve stem 91 against the valve seat 90 and trapping, below the partition 88, the air which has been drawn in during the process of extension. Thereupon, the shock absorbing strut is prepared for landing, and landing action may take place as heretofore described.

It will be appreciated that the specific forms of shock absorbing struts herein described, may readily be embodied in the general landing gear arrangement described toward the beginning of this specification, and it will also be appreciated that shock absorbing struts, as above described, may be embodied in other types of landing gears, wherein it is desired to fully collapse said struts so that they occupy substantially less space in their retracted position than they do in their extended position. It will also be appreciated that collapsing shock absorbing sruts, similar in principle but divergent in detail, may be applied to the general form of landing gear herein disclosed.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In aircraft, a retractable landing gear comprising a fixed length strut hinged to the aircraft, a movable member carried by said aircraft, a variable length strut hinged to said member and to said fixed strut, a connection between said fixed length strut and said movable member, and means for moving said member for effecting extension and retraction of said landing gear, said connection, upon movement of said member, being active to change the effective length of said variable length strut.

2. In aircraft, a retractable landing gear including a collapsible strut adapted to be collapsed upon retraction of said landing gear within the aircraft, said strut comprising a plunger and a cylinder within which said plunger is adapted to slide; a locking member carried adjacent said plunger, a dog carried by said member, and mechanism carried by said landing gear for engaging said dog to engage said locking member with said plunger when said landing gear is extended, for preventing collapsing of said strut.

3. In aircraft, a retractable landing gear including a telescoping strut having a plunger hinged to said aircraft and a cylinder within which said plunger is adapted to slide, locking mechanism carried by said plunger adapted in one position of adjustment to engage said cylinder to prevent collapsing of said strut and adapted, in a second position of adjustment, to disengage said cylinder to allow collapsing of said strut, and a cam carried by said plunger and engageable with said aircraft and with said mechanism for actuating said mechanism, said cam, when engaged with said aircraft, being operative to move said mechanism to a position for locking said strut from collapsing.

4. In aircraft, a retractable landing gear including a telescoping strut having a plunger hinged to said aircraft and a cylinder within which said plunger is adapted to slide, locking mechanism carried by said plunger adapted in one position of adjustment to engage said cylinder to prevent collapsing of said strut and adapted, in a second position of adjustment, to disengage said cylinder to allow collapsing of said strut, and a cam carried by said plunger and engageable with said mechanism, said cam being engageable with said aircraft, upon extension of said landing gear to move said mechanism to the position for preventing collapsing of said strut.

5. In aircraft, a retractable landing gear including a telescoping pneumatic shock absorber strut hinged to said aircraft and having a cylinder and a plunger slidable within said cylinder, an air valve carried by said strut for establishing communication between the interior of said strut and the outside air, and means responsive to movements of said landing gear between extended and retracted positions for closing and opening said valve.

6. In aircraft, a retractable landing gear including a telescoping strut adapted to contain air, a valve in said strut for allowing communication between the interior of said strut and the outside air, and means responsive in its operation to movements of said landing gear to an extended position for closing said valve.

7. In aircraft, a retractable landing gear including a telescoping pneumatic shock absorbing strut hinged to said landing gear, means for telescoping said strut upon retraction of said landing gear, a valve in said strut for allowing communication between the interior of said strut and the outside air, and means responsive in its operation to movement of said landing gear between extended and retracted positions for respectively closing and opening said valve.

8. In aircraft, a retractable landing gear including a member adapted to be traversed within said aircraft for retracting and extending said landing gear, a collapsible strut hinged at its upper end to said member, a fixed length strut hinged to said aircraft and to the lower end of said collapsible strut, a wheel carried by said struts, and a connection pivoted to said fixed length strut intermediate its length and pivoted at its upper end to said member, said connection, upon traversing said member to a retracted position, being operative to collapse said collapsible strut.

9. In a retractable landing gear for aircraft including a fixed length strut and a variable length strut hinged at their ends to spaced apart elements on said aircraft one said element being movable relative to said aircraft and hinged at their opposite ends to each other, and a tension member connecting said variable length strut with the mid-portion of said fixed length strut, whereby, upon retraction of said landing gear, the effective length of said variable length strut is lessened.

10. In a retractable landing gear, a telescoping resilient shock absorber strut, means for retracting said landing gear and said strut wholly within said aircraft, means responsive to retractive movement of said strut for exerting a compressive force thereon to shorten the overall length thereof, whereby said landing gear may be stowed in a smaller space within said aircraft than would otherwise be possible, and a member responsive to extensive movements of said strut for locking said strut in an extended position after extension thereof.

11. In aircraft, a retractable landing gear, a pneumatic shock absorber strut including a plunger slidable within a cylinder, means for sealing the interior of said strut against the escape of contained air when said landing gear is in its extended landing attitude, and operative upon retraction of said landing gear to open the interior of said strut to the outside air.

12. In aircraft, a retractable landing gear, a pneumatic shock absorber strut including a plunger slidable within a cylinder, means for sealing the interior of said strut against the escape of contained air when said landing gear is in its extended landing attitude, operative upon retraction of said landing gear to open the interior of said strut to the outside air, and mechanism for positively sliding said plunger within said cylinder as said landing gear is moved from its extended to its retracted position.

13. In aircraft, a retractable landing gear, means for retracting and extending said landing gear, said landing gear including a shock absorber strut having a plunger slidable within a cylinder, means for limiting the extent of sliding of said plunger within said cylinder when said landing gear is extended and is subjected to landing shocks, mechanism responsive to retractive movements of said strut for disengaging said limiting means to permit full sliding of said plunger within said cylinder, and a member also responsive to retractive movements of said strut for effecting the indicated full sliding of said plunger within said cylinder.

14. In aircraft, a retractable landing gear including a telescoping shock absorber strut of variable length, and means to vary the length thereof responsive to retractive movements of said landing gear, said means comprising a pair of tension members loosely connected to each other capable of movement relative to each other during variation in the length of said strut due to landing shocks, said members having limit stops engageable upon retraction of said landing gear whereby said members exert a telescoping force on said strut.

15. The combination in an aircraft retractable landing gear, of a telescoping variable length shock absorber strut, means for bodily moving said strut between extended and retracted landing gear positions, a locking device on said strut organized when locked to permit of strut telescoping between maximum and intermediate length conditions, and when unlocked to permit of telescoping to a minimum length condition, and means other than said strut moving means, responsive to retractive and extensive movement of the landing gear, for unlocking and locking respectively said locking device.

16. The combination in an aircraft retractable landing gear, of a telescoping variable length shock absorber strut, means for bodily moving said strut between extended and retracted landing gear positions, a locking device on said strut organized when locked to permit of strut telescoping between maximum and intermediate length conditions, and when unlocked to permit of telescoping to a minimum length condition, means other than said strut moving means, responsive to retractive and extensive movement of the landing gear, for unlocking and locking respectively said locking device, and a collapsible connection of given maximum length acting on said strut upon landing gear retraction to telescope said strut toward its minimum length condition.

17. The combination in an aircraft retractable landing gear, of a telescoping variable length shock absorber strut, means for bodily moving said strut between extended and retracted landing gear positions, a locking device on said strut organized when locked to permit of strut telescoping between maximum and intermediate length conditions, and when unlocked to permit of telescoping to a minimum length condition, means other than said strut moving means, responsive to retractive and extensive movement of the landing gear, for unlocking and locking respectively said locking device, and means responsive to retractive operation of said strut moving means for altering the length of said strut to its minimum length.

ARTHUR G. BUTLER.
RICHARD E. PALMER.
SAMUEL T. PAYNE.